D. B. WESSON.
SAFETY LOCK MECHANISM FOR FIRE ARMS.
No. 11,191. Reissued Sept. 15, 1891.
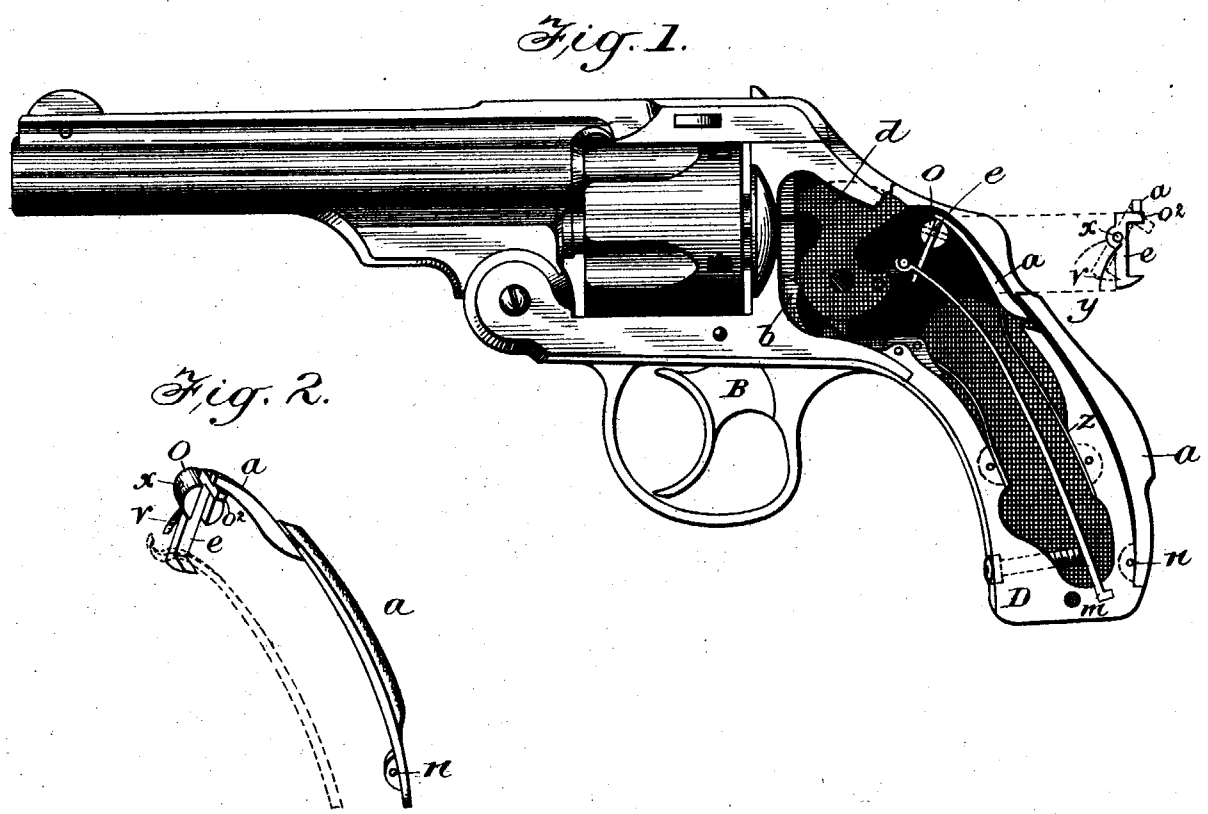
Witnesses.
J. W. Garfield
T. F. Duncan.
Inventor.
Daniel B. Wesson,
per Chapin & Co.
Atty's.
THE NORRIS PETERS CO., PHOTO-LITHO., WASHINGTON, D. C.

UNITED STATES PATENT OFFICE.

DANIEL B. WESSON, OF SPRINGFIELD, MASSACHUSETTS.

SAFETY-LOCK MECHANISM FOR FIRE-ARMS.

SPECIFICATION forming part of Reissued Letters Patent No. 11,191, dated September 15, 1891.

Original No. 323,839, dated August 4, 1885. Application for reissue filed May 20, 1891. Serial No. 393,508.

*To all whom it may concern:*

Be it known that I, DANIEL B. WESSON, a citizen of the United States, residing at Springfield, in the county of Hampden and State of Massachusetts, have invented new and useful Improvements in Revolving Fire-Arms, of which the following is a specification.

This invention relates to improvements in revolving fire-arms and pertains to the lock mechanism thereof, the object being to provide in a fire-arm improved devices for preventing the hammer from being inadvertently operated to discharge the arm.

In the drawings forming part of this specification, Figure 1 is a side elevation of a fire-arm, partly in section, embodying my invention, one of the detail parts in said figure being projected therefrom. Fig. 2 is a perspective view of certain detail parts separate from the arm, showing their operative relation.

In the drawings, D indicates the handle of the arm, the hammer *d* being hung in the frame in the usual manner and position. The mainspring *m* is connected with the hammer in the ordinary way. The sear *b* is pivotally connected with the trigger B and engages with the hammer in the usual way.

Within the upper part of the handle or frame, and on the side of the latter, is fixed in any suitable way a slotted stud *o*, and in the slot of said stud is hung on the pin *x* a hook *e*, having an arm $o^2$ extending from its upper end in the same direction as the hook on its lower end. A spring *v* has one end attached to the rear side of hook *e*, and its free end bears against the inside of the frame below stud *o*.

The hook *e*, constructed and applied to the interior of the arm near the hammer, as shown, has its lower hooked end thrown under the end of the mainspring *m*, near the hammer, by the spring *v* behind it, and while the hook occupies said position (see Figs. 1 and 2) the hammer cannot be cocked by pulling trigger B. It is obvious that said hook *e* may be made to engage with the stirrup instead of directly with the mainspring, if desired.

On the rear side of the handle D of the arm is pivoted at *n* a lever *a*, the form of which is shown in Fig. 2. The lever A extends from just below its said pivot-point on the handle outside of the latter to about opposite *y*, Fig. 1, where an opening is made through that side of the handle through which the free end of the lever *a* passes and rests on the arm $o^2$ of the hook *e*. An offset is made in the lever *a* between or at the junction of its outer and inner portion, whereby the opening in the handle is closed when the parts are in the position shown in Fig. 1.

In grasping the handle D to fire the arm, the finger of the hand being upon the trigger B, when the latter is pulled the hand is naturally forced against the lever *a*, pressing it downward and forcing its free end against the arm $o^2$ of hook *e*, and the lower end of the latter is made to swing from under the mainspring *m*, thus freeing the hammer from any obstacle to its proper action by means of the trigger. Thus if, with no intent to fire the arm, an attempt is made to pull the trigger without depressing lever *a* the trigger and hammer cannot be operated because of the presence of the hook *e* under the mainspring *m*, and hence the inadvertent discharge of the arm is prevented.

What I claim as my invention is—

The combination, with the mainspring of a firm-arm, of a hook, substantially as described, pivoted within the arm to vibrate by the side of and engage with said mainspring, a spring to swing said hook toward the latter, and a lever pivoted by one end on the outer rear side of the handle, having its free end penetrating the latter and bearing upon the end of said hook above its pivot, substantially as set forth.

DANIEL B. WESSON.

Witnesses:

WM. S. BELLOWS,

A. D. PORTER.